United States Patent
Inouchi et al.

(10) Patent No.: US 7,773,459 B2
(45) Date of Patent: Aug. 10, 2010

(54) UNDERWATER SOUNDING METHOD AND APPARATUS

(75) Inventors: Mitsuhiro Inouchi, Nishinomiya (JP);
Osamu Kubota, Nishinomiya (JP);
Toshiyuki Shimizu, Nishinomiya (JP);
Shintaro Oda, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 490 days.

(21) Appl. No.: 11/652,004

(22) Filed: Jan. 11, 2007

(65) Prior Publication Data

US 2007/0165489 A1    Jul. 19, 2007

Related U.S. Application Data

(60) Provisional application No. 60/743,128, filed on Jan. 13, 2006.

(51) Int. Cl.
*H04B 11/00* (2006.01)
(52) U.S. Cl. ........................................ 367/131
(58) Field of Classification Search ............ 367/81–191
See application file for complete search history.

(56) References Cited

U.S. PATENT DOCUMENTS 4,121,252 A * 10/1978 Saiki et al. .................. 348/380
4,873,676 A * 10/1989 Bailey et al. .................. 367/98
6,501,504 B1 * 12/2002 Tatko et al. ............... 348/229.1

FOREIGN PATENT DOCUMENTS

| JP | 08032635 A * | 2/1996 |
| JP | H11-311667 A | 11/1999 |
| JP | 3234988 B2 | 9/2001 |
| JP | 2006-010557 A | 1/2006 |

* cited by examiner

*Primary Examiner*—Thomas H Tarcza
*Assistant Examiner*—Luke D Ratcliffe
(74) *Attorney, Agent, or Firm*—Birch, Stewart, Kolasch & Birch, LLP

(57) ABSTRACT

Methods and apparatuses process signals. The method according to one aspect of the present invention receives a first signal; obtains a second signal and a third signal from the first signal, wherein a gain of the second signal is smaller than a gain of the third signal; detects saturation in the third signal; and generates a composite signal from the second signal and the third signal, the step of generating a composite signal including selecting a part of the second signal for the composite signal, when the detecting step detects saturation in the third signal, and selecting a part of the third signal for the composite signal, when the detecting step does not detect saturation in the third signal.

26 Claims, 8 Drawing Sheets

UNDERWATER SOUNDING METHOD AND APPARATUS

The present application claims priority under 35 USC §119(e) to U.S. Provisional Application No. 60/743,128 filed Jan. 13, 2006, which is hereby incorporated by reference herein in its entirety.

BACKGROUND OF THE INVENTION

1. Field of the Invention

The present invention relates generally to an underwater sounding technique, and more particularly to a method and apparatus with wide receiving dynamic range for processing signals from various underwater targets.

2. Description of the Related Art

Acoustic sounding apparatuses, such as echo sounders and scanning sonar, are typically used to detect underwater objects such as fish, seabed, etc., and to evaluate properties of underwater objects, such as length of fish, size of seabed rocks, etc. Such sounding apparatuses are typically installed on a ship, from where they transmit acoustic signals beneath the ship and into the water, to search for underwater objects and receive echo signals from them. The echo signals received from underwater objects are then processed to determine properties of the underwater objects that generated the echo signals.

Typical/conventional underwater sounding apparatuses include two or more receiving-amplifiers with different gains, that amplify echo signals received from underwater targets. For a given echo signal received from a target, a proper receiving-amplifier is selected from among, for example, a low-gain amplifier and a high-gain amplifier. The receiving-amplifier is selected based on the distance to the target, or on the time interval of travel of an echo signal from the target to a source such as a ship. The distance to a target is determined based on the time it takes for a sound pulse from a source such as a ship or a submarine, to bounce off a target and return as an echo signal to the source. Typically, a low-gain amplifier is selected for strong echo signals, such as signals originating at close-by targets, while a high-gain amplifier is selected for weak echo signals, such as signals originating at far away targets. Typical/conventional sounding technology uses Time Variable Gain Control (TVG) to compensate for underwater propagation loss of echo signals. Typically, to detect a given underwater target, a TVG curve suitable for the target is selected.

While the typical/conventional underwater sounding systems can work when the TVG curve selected for a target corresponds to the strength of the echo signal reflected by that target, the typical/conventional underwater sounding systems encounter challenges and are ineffective for mixed echo signals that are reflected by two or more targets of different target strengths, such as, for example, a small fish together with a big fish and a seabed area, as the TVG curves selected for one target may not be suitable for the other targets.

For example, if an echo signal reflected by a target with a small target strength, such as a small fish, is amplified by a low-gain receiving amplifier and coupled with a TVG curve appropriate for larger objects, the signal-to-noise ratio of the signal becomes unacceptably low. And if an echo signal reflected by a target with a large target strength, such as the seabed, is amplified by a high-gain receiving amplifier and coupled with a TVG curve suitable for small targets, the signal level saturates. Hence, the typical/conventional technology is not effective for target detection for a plurality of targets of different strengths, because the typical/conventional technology gives inaccurate or noisy results.

Disclosed embodiments of this application address these and other issues by using underwater sounding methods and apparatuses with a wide receiving dynamic range for processing underwater signals. The methods and apparatuses can receive and process signals associated with one target among two or more targets of different strengths, or with a plurality of targets of different strengths. The methods and apparatuses process signals received from underwater objects, output signals without switching errors or discontinuous points, and provide highly accurate measurements for underwater objects. The methods and apparatuses can be applied to other signals besides acoustic signals, originating in other media besides a water medium.

SUMMARY OF THE INVENTION

The present invention is directed to methods and apparatuses that process signals. According to a first aspect of the present invention, a method comprises: receiving a first signal; obtaining a second signal and a third signal from the first signal, wherein a gain of the second signal is smaller than a gain of the third signal; detecting saturation in the third signal; and generating a composite signal from the second signal and the third signal, the step of generating a composite signal including selecting a part of the second signal for the composite signal, when the detecting step detects saturation in the third signal, and selecting a part of the third signal for the composite signal, when the detecting step does not detect saturation in the third signal.

According to a second aspect of the present invention, a method comprises: receiving a first signal; obtaining a second signal and a third signal from the first signal, wherein a gain of the second signal is smaller than a gain of the third signal; and generating a composite signal, the generating step including performing a gain compensation for the third signal, to obtain a gain compensated third signal, selecting a part of the second signal for the composite signal, when a saturation of the third signal is detected, and selecting a part of the gain compensated third signal for the composite signal, when no saturation is detected in the third signal.

According to a third aspect of the present invention, an apparatus comprises: a signal input unit for providing a first signal; a signal processing unit for obtaining a second signal and a third signal from the first signal, wherein a gain of the second signal is smaller than a gain of the third signal; and a signal selection unit for generating a composite signal from the second signal and the third signal, the signal selection unit generating a composite signal by detecting saturation in the third signal, selecting a part of the second signal for the composite signal, when saturation is detected in the third signal, and selecting a part of the third signal for the composite signal, when no saturation is detected in the third signal.

According to a fourth aspect of the present invention, an apparatus comprises: a signal input unit for providing a first signal; a signal processing unit for obtaining a second signal and a third signal from the first signal, wherein a gain of the second signal is smaller than a gain of the third signal; and a signal selection unit for generating a composite signal, the signal selection unit generating a composite signal by performing a gain compensation for the third signal, to obtain a gain compensated third signal, selecting a part of the second signal for the composite signal, when a saturation of the third signal is detected, and selecting a part of the gain compensated third signal for the composite signal, when no saturation is detected in the third signal.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
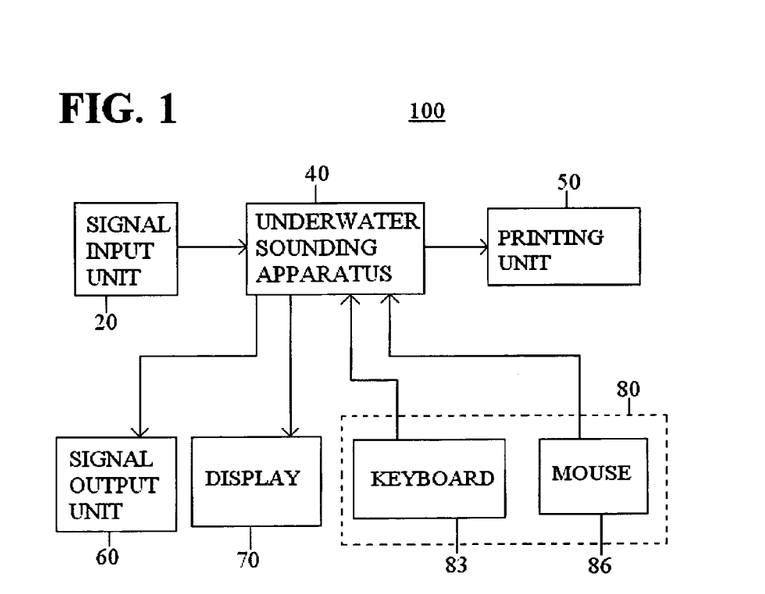
FIG. 1 is a general block diagram of a system including an underwater sounding apparatus according to an embodiment of the present invention.

Aspects of the invention are more specifically set forth in the accompanying description with reference to the appended figures. FIG. 1 is a general block diagram of a system including an underwater sounding apparatus according to an embodiment of the present invention. The system 100 illustrated in FIG. 1 includes the following components: a signal input unit 20; an underwater sounding apparatus 40; a display 70; a user input unit 80; a signal output unit 60; and a printing unit 50. Operation of the system 100 in FIG. 1 will become apparent from the following discussion.

The signal input unit 20 provides signals to underwater sounding apparatus 40. Signals can be acoustic signals, electromagnetic signals, etc. Examples of signals that can be provided by signal input unit 20 are acoustic echo signals reflected from fish, seabed, underwater rocks, etc. Signal input unit 20 may be one or more of any number of devices providing signal data. Signal input unit 20 may be, for example: a sensor; an electromechanical energy-converting device; an electro-acoustic energy-converting device; a transducer; a receiver; etc. The signal input unit 20 may be installed in a location where signals can be received. For example, the signal input unit 20 may be installed on the hull bottom of a ship, in a "look" forward position along a watercraft propulsion axis, etc.

The underwater sounding apparatus 40 receives signal data from the signal input unit 20, and processes signals in a manner discussed in detail below. The underwater sounding apparatus 40 processes signals and determines characteristics of underwater objects associated with the signals. A user may view outputs of underwater sounding apparatus 40, including intermediate processing results of signals, via display 70, and may input commands to the underwater sounding apparatus 40 via the user input unit 80. In the embodiment illustrated in FIG. 1, the user input unit 80 includes a keyboard 83 and a mouse 86, but other conventional input devices could also be used.

In addition to performing processing of signals in accordance with embodiments of the present invention, the underwater sounding apparatus 40 may perform additional signal processing and preparation operations, in accordance with commands received from the user input unit 80. Such signal preprocessing and preparation operations may include known operations for signal amplification, quantization, compression, frequency correction, etc.

The printing unit 50 receives the output of underwater sounding apparatus 40 in various forms, such as in the forms of graphs of signal amplitudes, graphs of frequencies, geometric data related to underwater objects, etc., and generates a hard copy of the processed signal data. The printing unit 50 may be, for example, a conventional color laser printer, a black-and-white printer, etc. In addition or as an alternative to generating a hard copy of the output of the underwater sounding apparatus 40, the processed signal data may be returned as a file, e.g., via a portable recording medium, a CD-R, a floppy disk, a USB drive, or via a network (not shown). The display 70 receives the output of the underwater sounding apparatus 40 and displays signal data such as, for example, frequency graphs, waveforms, etc. The output of underwater sounding apparatus 40 may also be sent to signal output unit 60. Signal output unit 60 may be, for example, a database that stores signal processing results received from underwater sounding apparatus 40; an application that uses signal processing results from underwater sounding apparatus 40 to determine characteristics of underwater objects, such as length and size of fish, quality of seabed, distance to seabed or fish, etc.

Figure 2:
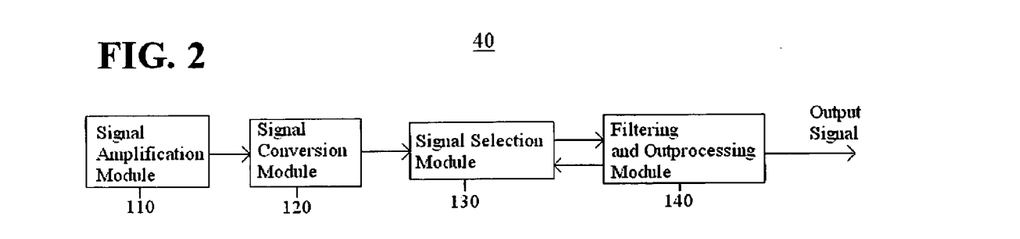
FIG. 2 is a block diagram illustrating in more detail aspects of an underwater sounding apparatus according to an embodiment of the present invention.

FIG. 2 is a block diagram illustrating in more detail aspects of an underwater sounding apparatus 40 according to an embodiment of the present invention. As shown in FIG. 2, an underwater sounding apparatus 40 according to this embodiment includes: a signal amplification module 110; a signal conversion module 120; a signal selection module 130; and a filtering and outprocessing module 140. Although the various components of FIG. 2 are illustrated as discrete elements, such an illustration is for ease of explanation and it should be recognized that certain operations of the various components may be performed by the same physical device, e.g., by one or more circuit boards or microprocessors.

Generally, the arrangement of elements for the underwater sounding apparatus 40 illustrated in FIG. 2 receives signals from signal input unit 20, performs amplification, conversion, and selection of signals, filters signals, and outputs a signal. Signals received from signal input unit 20 may be, for example, echo signals reflected by underwater targets. Such underwater targets include fish, seabed, rocks, etc. Signal data output by underwater sounding apparatus 40 may be, for example, waveforms obtained from echo signals that were received by underwater sounding apparatus 40, digital data, etc. Underwater sounding apparatus 40 may output signal data to printing unit 50, display 70 and/or signal output unit 60.

Signal amplification module 110, signal conversion module 120, signal selection module 130, and filtering and outprocessing module 140 can be electronic systems and circuits, hardware systems, purpose built hardware such as FPGA, ASIC, etc., in exemplary implementations. Signal amplification module 110, signal conversion module 120, signal selection module 130, and filtering and outprocessing module 140 may also be software systems/applications, or a combination of software and hardware systems. In one exemplary implementation, signals are digitized at signal conversion module 120, and the succeeding units, that include signal selection module 130 and filtering and outprocessing module 140 are implemented as a software application. Operation of the components included in underwater sounding apparatus 40 illustrated in FIG. 2 will be next described with reference to FIGS. 4-7B.

Figure 3A:
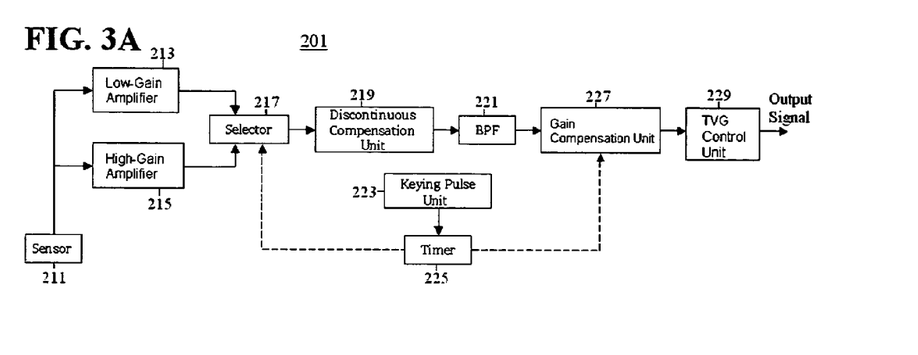
FIG. 3A is a block diagram illustrating conventional technology for processing of signals from underwater targets.

FIG. 3A is a block diagram illustrating conventional technology for processing of signals from underwater targets. A conventional technology apparatus 201 for processing of signals from underwater targets includes: a sensor 211; a low-gain amplifier 213; a high-gain amplifier 215; a selector 217; a discontinuous compensation unit 219; a bandpass filter (BPF) 221; a gain compensation unit 227; a keying pulse unit 223; a timer 225; and a Time Variable Gain (TVG) control unit 229.

The dynamic range of a conventional receiving amplifier or of an A/D conversion device intended for general use is not wide enough for use in underwater target observation. As a result, it is hard to obtain a wide receiving dynamic range for underwater target observation, using a receiving amplifier or an A/D conversion device.

The echo signal reflected by a target decreases gradually in intensity according to the distance traveled by the echo signal from the target, or according to the time interval needed for the echo signal to travel back from the target. To improve the dynamic range for echo signals, two receiving-amplifiers with different gains may be used, instead of a single receiving-amplifier. As shown in FIG. 3A, a conventional technology uses two such receiving-amplifiers. The gain of the low-gain amplifier 213 is lower than the gain of the high-gain amplifier 215.

For a given echo signal received from a target, a receiving-amplifier is selected from among the low-gain amplifier 213 and the high-gain amplifier 215, based on the distance to the target or the travel time of the echo signal from the target. The distance to a target is determined based on the time it takes for a sound pulse from a source, such as a ship, to bounce off a target and return as an echo signal to the source. Typically, the low-gain amplifier 213 is selected for strong echo signals, and the high-gain amplifier 215 is selected for weak echo signals. Hence, the low-gain amplifier 213 is generally selected for echo signals from near field (close-by targets), because such echo signals are strong. On the other hand, the high-gain amplifier 215 is generally selected for echo signals from far field (far away targets), because such echo signals are weak. The selection of a receiving-amplifier from among the low-gain amplifier 213 and the high-gain amplifier 215 is performed using a signal output from timer 225. Timer 225 counts a time interval from a time reference of a keying pulse from keying pulse unit 223, to compensate for a propagation loss to a target.

Figure 3B:
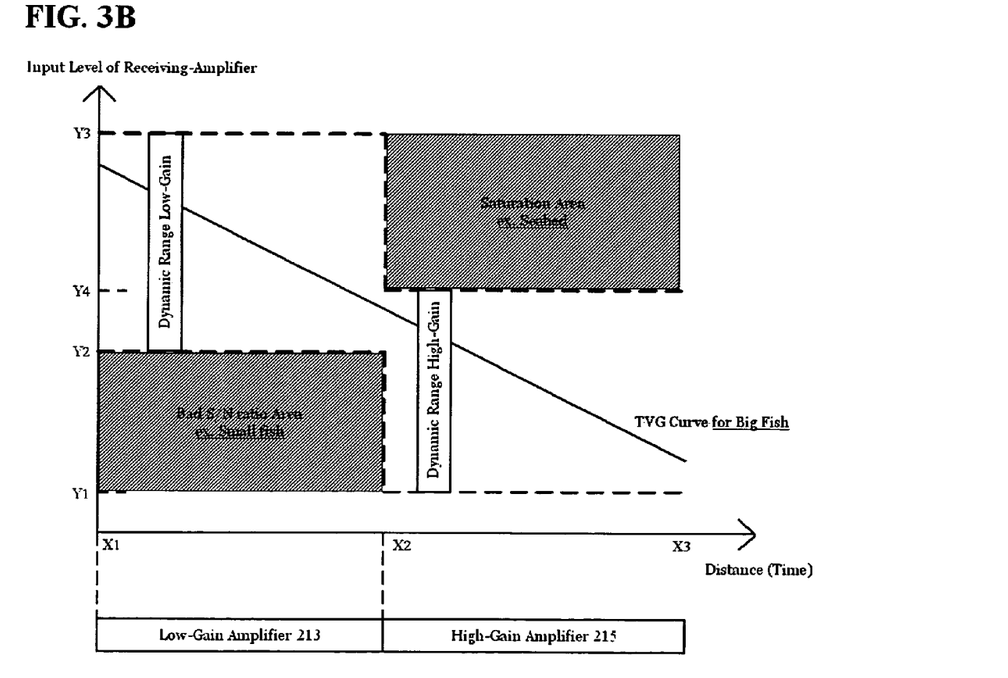
FIG. 3B is a diagram illustrating operations for the conventional technology for processing of signals from underwater targets illustrated in FIG. 3A.

FIG. 3B is a diagram illustrating operations for the conventional technology for processing of signals from underwater targets illustrated in FIG. 3A. In FIG. 3B, the X-axis is distance or time, and the Y-axis represents the input level of receiving amplifiers 213 and 215. The dynamic range of low-gain amplifier 213 extends between points Y2 and Y3 on the Y-axis. Low-gain amplifier 213 is generally selected for strong echo signals. Strong echo signals are typically from near field (close-by targets). The range of near field extends between points X1 and X2 on the X-axis.

The dynamic range of high-gain amplifier 215 extends between points Y1 and Y4 on the Y-axis. High-gain amplifier 215 is generally selected for weak echo signals. Weak echo signals are typically from far field (far away targets). The range of far field extends from point X2, to point X3, and further out along the X-axis. Points from X2 further out on the X-axis correspond to larger distances and larger signal return times.

Conventional sounding technology uses Time Variable Gain Control (TVG) to compensate for underwater propagation loss. Typically, for detection of an underwater target, a suitable TVG curve is selected. Next, a gain control is adjusted, for target detection. A TVG curve is set based on the response from a detection target, and a table may be used to set the TVG curve based on a propagation loss from the target. Since propagation loss depends on transmission frequency and on the detection target, a TVG curve can be obtained as a table on which each curve value is determined by transmission frequencies and a size of the detection target. For example, one TVG curve may correspond to 50 KHz-big fish, while another TVG curve may correspond to 200 KHz-small fish. In FIG. 3B, a TVG curve, suitable for the propagation loss associated with signals from a big fish is selected.

The conventional time selecting system illustrated in FIG. 3A can be effective when the TVG curve selected for a target corresponds to the strength of the echo signal reflected by that target. However, the conventional system illustrated in FIG. 3A encounters challenges and becomes ineffective for mixed echo signals that are reflected by two or more targets of different strengths, such as a small fish, a big fish, and a seabed, because one TVG curve selected for multiple targets may not be suitable for multiple echo signals received from multiple targets. FIG. 3B illustrates cases in which the conventional sounding technology is not effective in target detection.

In FIG. 3B, a TVG curve is set for a big fish. The switching timing (a change at point X2) of amplifiers is determined according to this TVG curve. However, an echo signal reflected by a different target, such as a small fish, will have a small target strength, even if the small fish is spatially close (at near field) to the underwater apparatus 201. Hence, the level of a received echo signal from a small fish located in the vicinity of the underwater apparatus 201 is below the dynamic range of the low-gain amplifier 213 before a switching timing of amplifiers occurs from X1 to X2. Hence, the level of a received echo signal from a small fish located in the vicinity of the underwater apparatus 201 lies between points Y1 and Y2. When the received echo signal level is below the dynamic range of the low-gain amplifier 213, the signal-to-noise (S/N) ratio of the signal from the small fish becomes unacceptably low.

Moreover, an echo signal reflected by a target such as a seabed, has a large target strength even if the seabed is spatially far away (at far field) from the underwater apparatus 201. Hence, the level of a received echo signal from a seabed located far away from the underwater apparatus 201 is above the dynamic range of high-gain amplifier 215, so the signal lies between points Y3 and Y4 after the switching timing of amplifiers occurs from X2 to X3. If the received echo signal level is above the dynamic range of the high-gain amplifier 215, the echo signal becomes saturated.

Therefore, with the underwater apparatus 201, only if an echo signal is reflected by a target with a medium target strength, such as a big fish, and coupled with a TVG curve, a receiving-amplifier (selected as either the low-gain amplifier 213 or the high-gain amplifier 215) will produce an output signal without a low S/N ratio and without saturation regions.

Figure 4:
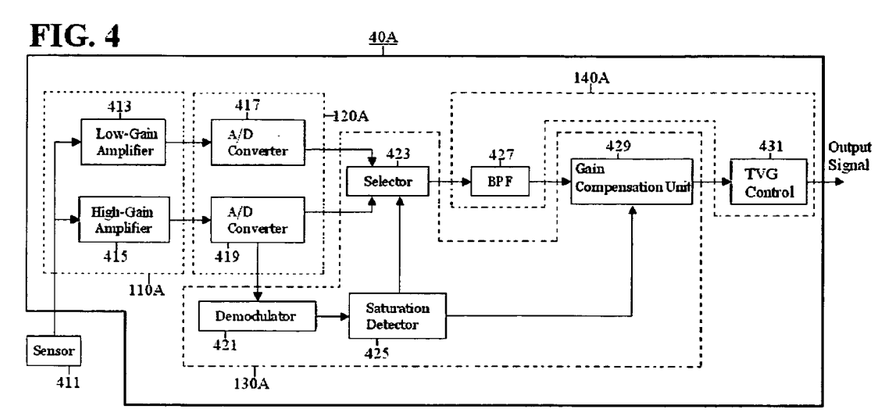
FIG. 4 is a block diagram illustrating an underwater sounding apparatus according to an embodiment of the present invention illustrated in FIG. 2.

FIG. 4 is a block diagram illustrating an underwater sounding apparatus 40A according to an embodiment of the present invention illustrated in FIG. 2. As shown in FIG. 4, an underwater sounding apparatus 40A according to this embodiment includes: a low-gain amplifier 413; a high-gain amplifier 415; A/D converters 417 and 419; a demodulator 421; a saturation detector 425; a selector 423; a band-pass filter (BPF) 427; a gain compensation unit 429; and a Time Variable Gain (TVG) control 431. Low-gain amplifier 413 and high-gain amplifier 415 are included in a signal amplification module 110A. A/D converters 417 and 419 are included in a signal conversion module 120A. Demodulator 421, saturation detector 425, selector 423 and gain compensation unit 429 are included in a signal selection module 130A. Band-pass filter (BPF) 427 and TVG control 431 are included in a filtering and outprocessing module 140A.

Sensor 411 is included in signal input unit 20, and receives signals such as, for example, acoustic echo signals reflected from fish, seabed, underwater objects, etc. Sensor 411 may be, for example, a conventional electromechanical energy-converting device, an electro-acoustic energy-converting device, a transducer, a receiver, etc. Sensor 411 transmits received signals to high-gain amplifier 415 and low-gain amplifier 413.

High-gain amplifier 415 and low-gain amplifier 413 perform amplification of received signals. High-gain amplifier 415 and low-gain amplifier 413 may be electric or electronic circuits used for amplification. The gain of high-gain amplifier 415 is higher than the gain of low-gain amplifier 413. High-gain amplifier 415 and low-gain amplifier 413 send amplified signals to A/D converters 419 and 417.

A/D converters 417 and 419 are analog-to-digital converter electronic or electric circuits that convert continuous (analog) signals to digital signals. A/D converter 417 sends a low-gain digital signal to selector 423. A/D converter 419 sends a high-gain digital signal both to selector 423 and demodulator 421. Selector 423 may be, for example, one of the functions programmed in an FPGA. Selector 423 can operate like a multiplexer, to select one of the output signals from A/D converter 417 or A/D converter 419, based on instruction from saturation detector 425.

Demodulator 421 is an electronic or electric circuit used to recover information from the carrier wave of a signal. Demodulator 421 may be, for example, an envelope detector, a diode detector, a rectifier, a digital signal processor, etc. Demodulator 421 demodulates the high-gain digital signal and extracts a demodulated signal, such as, for example, an envelope signal, from the high-gain digital signal.

The demodulated signal is sent to saturation detector 425, which detects saturation regions in the demodulated signal. The saturation detector 425 detects a saturation part of the demodulated signal of the high-gain digital signal. Saturation detector 425 outputs a Yes/No flag to selector 423 and to gain compensation unit 429, to indicate whether the input signal was saturated or not. The selector 423 typically selects the high-gain digital signal from the A/D converter 419, unless the saturation detector 425 detects a saturation part in the demodulated signal. If the saturation detector 425 detects a saturation part in the demodulated signal, the selector 423 selects the low-gain digital signal from the A/D converter 417.

Saturation detector 425 may be, for example, an electric or electronic circuit including comparators, diodes, a comparator in an analog system, a function programmed in an FPGA in a digital system, etc. Saturation detector 425 sends the results of saturation detection to selector 423 and to gain compensation unit 429. High-gain and low-gain selected signals from selector 423 are filtered by band-pass filter BPF 427 to remove system noise, and then sent to gain compensation unit 429. Gain compensation unit 429 uses the filtered high-gain and low-gain digital signals together with saturation information from saturation detector 425, to compensate for differences in high-gain and low-gain signal levels and obtain a smooth signal. Gain compensation unit 429 may include electric and electronic components such as resistors, potentiometers, amplifiers, adders, etc. Gain compensation unit 429 may be a register, a potentiometer, or the like in an analog system, one of the functions programmed in an FPGA in a digital system, etc. The output of gain compensation unit 429 is sent to TVG control 431. TVG control 431 corrects for propagation loss. TVG control 431 may perform time variable gain control for the signal output from gain compensation unit 429 by, for example, providing a higher gain for signals that originated from objects at long ranges underwater, and a lower gain for signals that originated from objects at short ranges underwater. TVG control 431 thus compensates for larger acoustic propagation losses for signals arriving from longer ranges. TVG control 431 produces an output signal.

The underwater sounding apparatus 40A in FIG. 4 outputs an unsaturated and fully magnified signal for an input signal. Although the underwater sounding apparatus 40A is illustrated with two receiving-amplifiers (units 413 and 415), A/D converters (417 and 419) and a detector circuit (including the demodulator 421 and the saturation detector 425), the underwater sounding apparatus 40A may include more than two receiving-amplifiers, A/D converters and more detector circuits associated with the receiving-amplifiers.

The underwater sounding apparatus 40A outputs a fully magnified and unsaturated signal regardless of the strength of the targets that produced the input signal at sensor 411. Hence, underwater sounding apparatus 40A has the effect of a wide dynamic range amplifier.

The A/D converters 417 and 419 are optional. Filtering and outprocessing module 140A is also optional. When A/D converters are used, converted digital signals are processed. In one exemplary embodiment, A/D converters are not used, analog signals are used instead, and signal selection module 130A is implemented with hardware, instead of an FPGA.

Sensor 411, low-gain amplifier 413, high-gain amplifier 415, A/D converters 417 and 419, demodulator 421, saturation detector 425, selector 423, BPF 427, gain compensation unit 429, and TVG control 431 may be implemented using hardware and/or software.

Figure 5A:
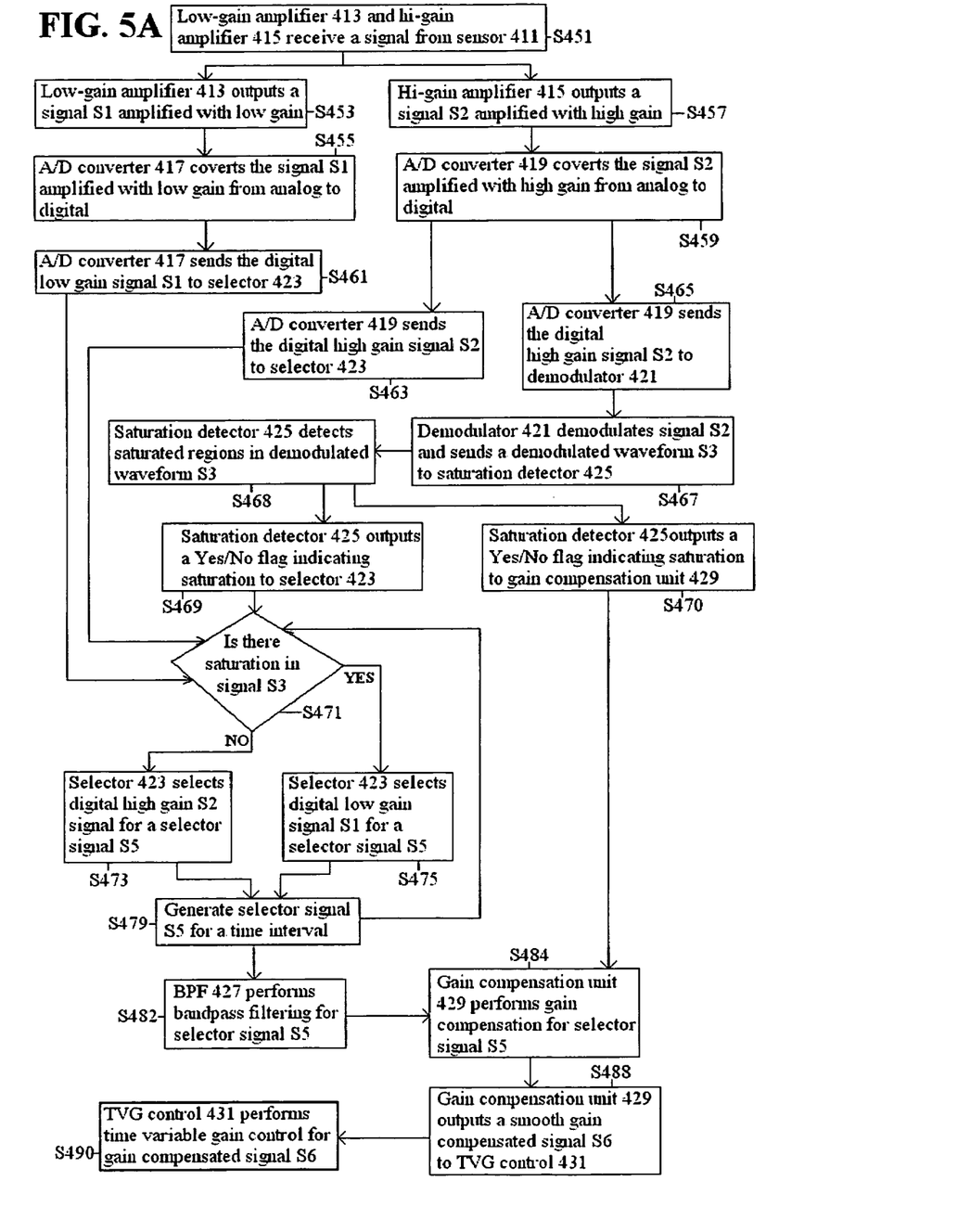
FIG. 5A is a flow diagram illustrating operations performed by an underwater sounding apparatus according to an embodiment of the present invention illustrated in FIG. 4.

FIG. 5A is a flow diagram illustrating operations performed by an underwater sounding apparatus 40A according to an embodiment of the present invention illustrated in FIG. 4. Low-gain amplifier 413 and high-gain amplifier 415 receive (S451) a signal from sensor 411. The signal may be an acoustic signal, an echo signal received from an underwater object, etc. The low-gain amplifier 413 outputs (S453) a signal S1 amplified with low gain and sends it to A/D converter 417. A/D converter 417 coverts (S455) the signal S1 amplified with low gain from analog to digital. High-gain amplifier 415 outputs (S457) a signal S2 amplified with high gain and sends it to A/D converter 419. A/D converter 419 then coverts (S459) the signal S2 amplified with high gain from analog to digital.

A/D converter 417 sends (S461) the digital low gain signal S1 to selector 423. A/D converter 419 sends (S463) the digital high gain signal S2 to selector 423. A/D converter 419 also sends (S465) the digital high gain signal S2 to demodulator 421. Demodulator 421 demodulates (S467) the signal S2 from the A/D converter 419 and sends (S467) a demodulated waveform S3, such as an envelope waveform, to saturation detector 425.

Saturation detector 425 detects (S468) whether the demodulated waveform S3 includes saturated regions, and outputs (S469, S470) a Yes/No flag to indicate whether the signal S3 has been saturated or not. Saturation detector 425 outputs the Yes/No flag to selector 423 and to gain compensation unit 429.

Selector 423 performs a test (S471) to determine if there is saturation in signal S3 at a time t1. If no saturation occurs at time t1, the selector 423 selects (S473) the digital high gain S2 signal at time t1 for a selector signal S5. If saturation occurs at time t1, the selector 423 selects (S475) the digital low gain signal S1 at time t1 for the selector signal S5. Selector 423 generates (S479) selector signal S5 for a time interval, by performing steps S471, S473 and S475 at multiple times in the time interval. The selector 423 next sends the selector signal S5 to BPF 427, which performs (S482) bandpass filtering for the selector signal S5. The bandpass filtered selector signal S5 is then sent to gain compensation unit 429, which performs (S484) gain compensation for the bandpass filtered selector signal S5. Gain compensation may, for example, change the gain of the high gain signal S2 portions in the selector signal S5 by a fixed factor, while keeping the low gain signal S1 portions in the selector signal S5 unchanged, so that the transitions between regions of the high gain signal S2 and regions of the low gain signal S1 in the selector signal S5 are smooth. Gain compensation unit 429 outputs (S488) a smooth gain compensated signal S6 to TVG control 431. TVG control 431 performs time variable gain control (S490) for the gain compensated signal S6. TVG control 431 may perform time variable gain control by, for example, providing a high gain for signals that originated from objects at long ranges underwater, and a lower gain for signals that originated from objects at short ranges underwater. TVG control 431 thus compensates for larger acoustic propagation losses for signals arriving from longer ranges. To compensate for propagation losses, TVG control 431 may use a TVG curve selected beforehand by the user, for that signal.

Figure 5B:
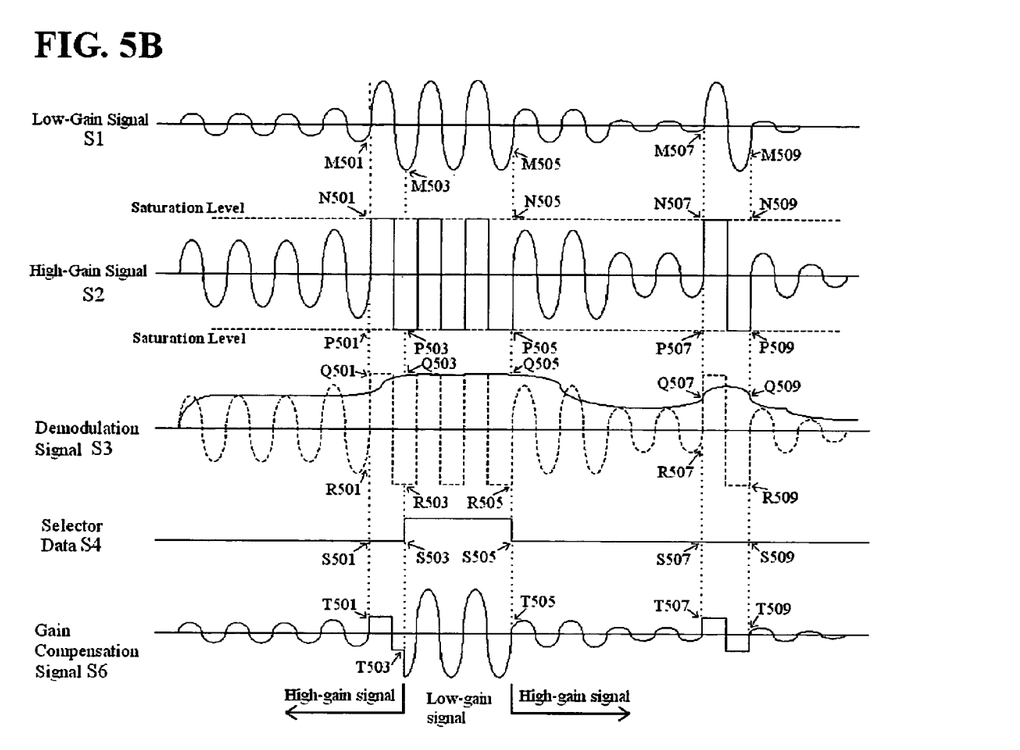
FIG. 5B illustrates exemplary aspects of operations performed by an underwater sounding apparatus according to the operations illustrated in the flow diagram of FIG. 5A.

FIG. 5B illustrates exemplary aspects of operations performed by an underwater sounding apparatus 40A according to the operations illustrated in the flow diagram of FIG. 5A. FIG. 5B illustrates exemplary aspects of operations for obtaining a gain compensated signal S6.

In FIG. 5B, the low-gain signal S1 is the signal obtained from the low-gain amplifier 413. The high-gain signal S2 is the signal obtained from the high-gain amplifier 415. The high-gain signal S2 exhibits saturation between points N501 and P505, and between points N507 and P509. Demodulated signal S3 is the signal obtained after demodulation of high-gain signal S2 in demodulator 421. Selector data S4 illustrates status for a Yes/No flag that indicates whether the signal S3 was saturated or not. The selector data S4 is obtained by saturation detector 425 from demodulated signal S3, and tracks saturation of high-gain signal S2. The selector data 54 detects saturation between points S503 and S505, which correspond to points P503 and P505 of high-gain signal S2. Consequently, selector 423 selects the low-gain signal S1 between corresponding points M503 and M505 of the low-gain signal S1. Selector 423 selects the high-gain signal S2 everywhere else.

Gain compensation unit 429 also receives the selector data S4. In one exemplary embodiment, gain compensation unit 429 compensates the gain of the signal from the high-gain amplifier to match the signal from the low-gain amplifier. For example, gain compensation unit 429 performs gain compensation of the high-gain signal S2 so that the transition points T503 and T505 between high-gain signal S2 and low-gain signal S1 occur at the same signal value. Gain compensation unit 429 outputs the gain compensated signal S6.

Figure 6:
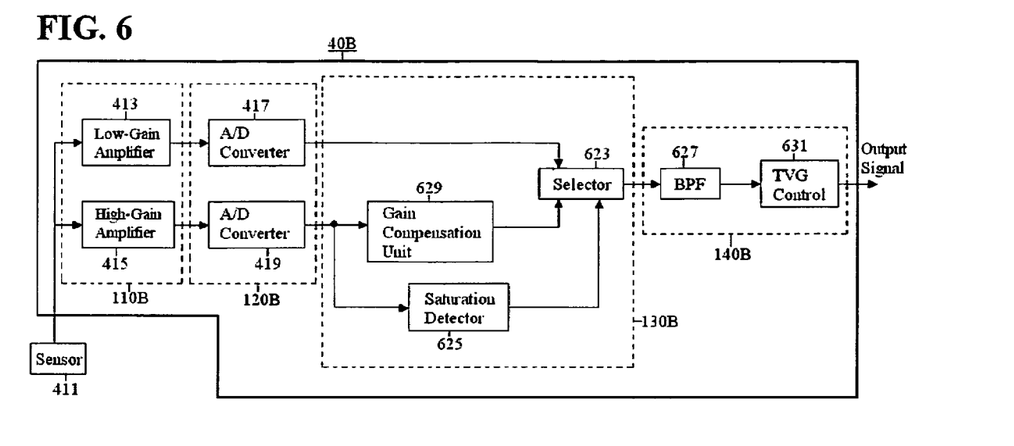
FIG. 6 is a block diagram illustrating an underwater sounding apparatus according to a different embodiment of the present invention.

FIG. 6 is a block diagram illustrating an underwater sounding apparatus 40B according to a different embodiment of the present invention. As shown in FIG. 6, an underwater sounding apparatus 40B according to this embodiment includes: a low-gain amplifier 413; a high-gain amplifier 415; A/D converters 417 and 419; a saturation detector 625; a gain compensation unit 629; a selector 623; a band-pass filter (BPF) 627; and a Time Variable Gain (TVG) control 631. Low-gain amplifier 413 and high-gain amplifier 415 are included in a signal amplification module 110B. A/D converters 417 and 419 are included in a signal conversion module 120B. Saturation detector 625, selector 623 and gain compensation unit 629 are included in a signal selection module 130B. Band-pass filter (BPF) 627 and TVG control 631 are included in a filtering and outprocessing module 140B. Filtering and outprocessing module 140B is optional.

Sensor 411 is included in signal input unit 20, and receives signals such as, for example, acoustic echo signals reflected from fish, seabed, underwater objects, etc. Sensor 411 may be, for example, a conventional electromechanical energy-converting device, an electro-acoustic energy-converting device, a transducer, a receiver, etc. Sensor 411 transmits the received signals to high-gain amplifier 415 and low-gain amplifier 413.

High-gain amplifier 415 and low-gain amplifier 413 perform amplification of received signals. High-gain amplifier 415 and low-gain amplifier 413 may be electric or electronic circuits used for amplification. The gain of high-gain amplifier 415 is higher than the gain of low-gain amplifier 413. High-gain amplifier 415 and low-gain amplifier 413 send amplified signals to A/D converters 419 and 417.

A/D converters 417 and 419 are analog-to-digital converter electronic or electric circuits that convert continuous (analog) signals to digital signals. A/D converter 417 sends a low-gain digital signal to selector 623. A/D converter 419 sends a high-gain digital signal to both gain compensation unit 629 and saturation detector 625. Saturation detector 625 detects saturated points in the high-gain digital sampling for the signal received from A/D converter 419, and sends detection information to selector 623. Saturation detector 625 may be an electric or electronic circuit including comparators, diodes, etc., may be a function programmed in an FPGA in a digital system, etc.

Gain compensation unit 629 changes the gain of the high-gain digital signal received from A/D converter 419 to obtain a gain compensated digital signal which is compatible in magnitude with the low-gain digital signal from A/D converter 417. Gain compensation unit 629 may include electric and electronic components such as resistors, potentiometers, amplifiers, adders, etc., may be a function programmed in an FPGA in a digital system, etc.

Selector 623 receives the low-gain digital signal from A/D converter 417, the gain compensated digital signal from gain compensation unit 629, and the saturation detection information from saturation detector 625. Selector 623 selects, for each sampling of a composite signal, data points from a sampling of the low-gain digital signal or from a sampling of the gain compensated digital signal. Instead of using a demodulator, selector 623 uses the detection information from saturation detector 625 to detect saturation parts in the gain compensated digital signal that resulted from the high-gain digital signal from A/D converter 419. When the signal level outputted from the high-gain side is smaller than a saturation level, the selector 623 outputs the gain compensated digital signal from gain compensation unit 629. When the signal level outputted from the high-gain side is larger than the saturation level, the selector 623 outputs the low-gain digital signal from A/D converter 417. Selector 623 may, for example, operate like a multiplexer, may be one of the functions programmed in an FPGA, etc.

In an exemplary embodiment, the phases of the receiving-amplifiers 413 and 415 are preferably the same, and the A/D converters 417 and 419 preferably perform a simultaneous sampling, so that the low-gain digital signal from A/D converter 417 and the gain compensated digital signal from gain compensation unit 629 are comparable at each sampling time. In this manner, underwater sounding apparatus 40B avoids errors associated with saturated signal data points.

The composite signal from selector 623 is next filtered by band-pass filter BPF 627, and then sent to TVG control 631. TVG control 631 corrects for propagation loss. TVG control 631 may perform time variable gain control by, for example, providing a high gain for signals that originated from an object at a long range, and a lower gain for signals that originated from an object at a short range. TVG control 631 thus compensates for larger acoustic propagation losses for signals arriving from longer ranges.

Although the underwater sounding apparatus 40B is illustrated with two receiving-amplifiers (units 413 and 415), A/D converters (417 and 419) and a detector circuit (including the gain compensation unit 629, the saturation detector 625, and the selector 623), the underwater sounding apparatus 40B can comprise more than two receiving-amplifiers, A/D converters, and more detector circuits or detector circuit elements. The underwater sounding apparatus 40B outputs a fully magnified and unsaturated signal regardless of the strength of the targets that produced the input signal at sensor 411.

Sensor 411, low-gain amplifier 413, high-gain amplifier 415, A/D converters 417 and 419, saturation detector 625, gain compensation unit 629, selector 623, BPF 627, and TVG control 631 may be implemented using hardware and/or software.

Figure 7A:
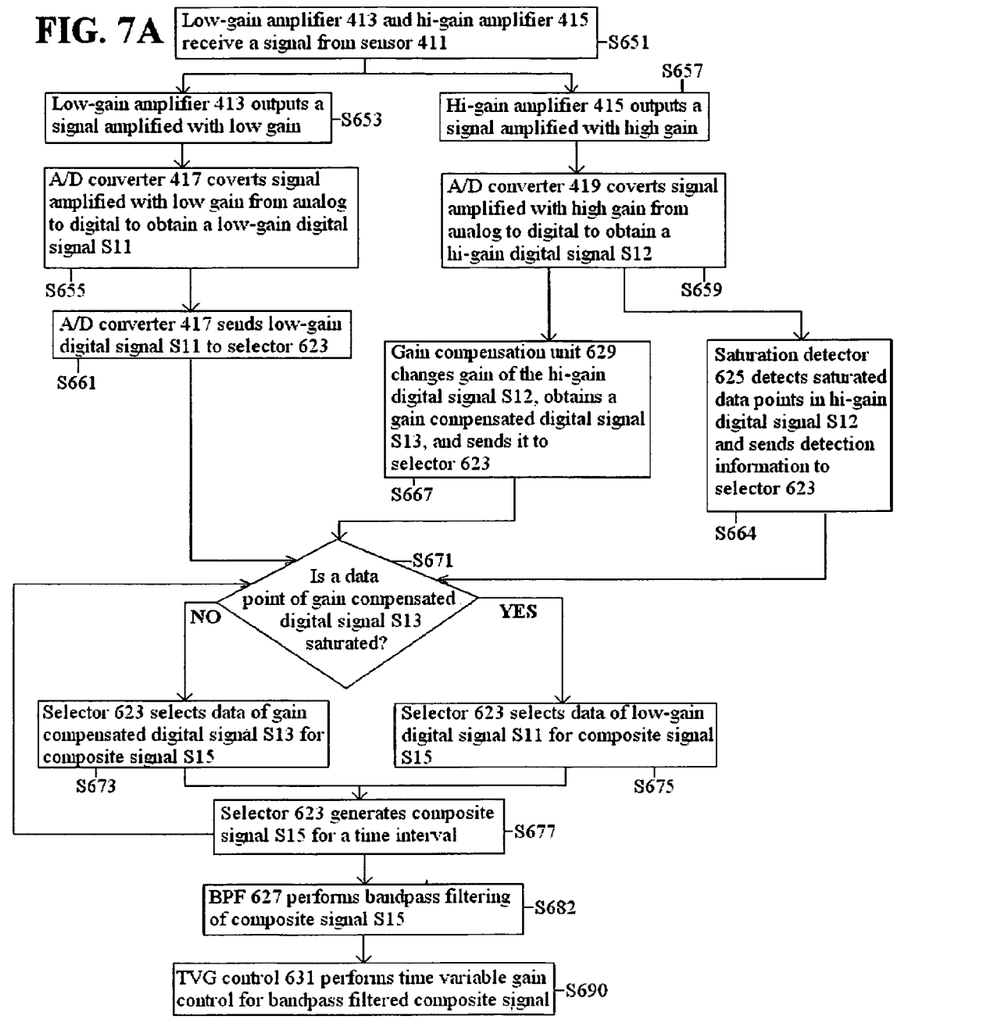
FIG. 7A is a flow diagram illustrating operations performed by an underwater sounding apparatus according to an embodiment of the present invention illustrated in FIG. 6.

FIG. 7A is a flow diagram illustrating operations performed by an underwater sounding apparatus 40B according to an embodiment of the present invention illustrated in FIG. 6. Low-gain amplifier 413 and high-gain amplifier 415 receive (S651) a signal from sensor 411. The signal may be an acoustic signal, an echo signal received from an underwater object, etc. The low-gain amplifier 413 outputs (S653) a signal amplified with low gain and sends it to A/D converter 417. A/D converter 417 coverts (S655) the signal amplified with low gain from analog to digital to obtain a low-gain digital signal S11. High-gain amplifier 415 outputs (S657) a signal amplified with high gain and sends it to A/D converter 419. A/D converter 419 coverts (S659) the signal amplified with high gain from analog to digital to obtain a high-gain digital signal S12.

A/D converter 417 sends (S661) the low-gain digital signal S11 to selector 623. A/D converter 419 sends the high-gain digital signal S12 to gain compensation unit 629 and to saturation detector 625. Saturation detector 625 detects (S664) saturated data points in the high-gain digital signal S12, and sends (S664) detection information to selector 623. Gain compensation unit 629 changes (S667) the gain of the high-gain digital signal S12 received from A/D converter 419, to obtain a gain compensated digital signal S13 that is compatible with the low-gain digital signal S11.

Selector 623 receives the low-gain digital signal S11 from A/D converter 417, the gain compensated digital signal S13 from gain compensation unit 629, and the saturation detection information from saturation detector 625. Using the saturation detection information, selector 623 performs a test (S671) to determine if a data point of the gain compensated digital signal S13 is saturated. If the signal level of the gain compensated digital signal S13 is smaller than a saturation level, the selector 623 selects (S673) data of the gain compensated digital signal S13 for a composite signal S15. If the signal level of the gain compensated digital signal S13 is larger than or equal to a saturation level, the selector 623 selects (S675) data of the low-gain digital signal S11 for a composite signal S15. Selector 623 generates (S677) composite signal S15 for a time interval.

The selector 623 then outputs the composite signal S15 to BPF 627, which performs bandpass filtering (S682) for the composite signal S15. The bandpass filtered composite signal is then sent to TVG control 631. TVG control 631 performs time variable gain control (S690) for the bandpass filtered composite signal. TVG control 631 may perform time variable gain control by, for example, providing a high gain for signals that originated from an object at a long range underwater, and a lower gain for signals that originated from an object at a short range underwater. TVG control 631 thus compensates for larger acoustic propagation losses for signals arriving from longer ranges.

Figure 7B:
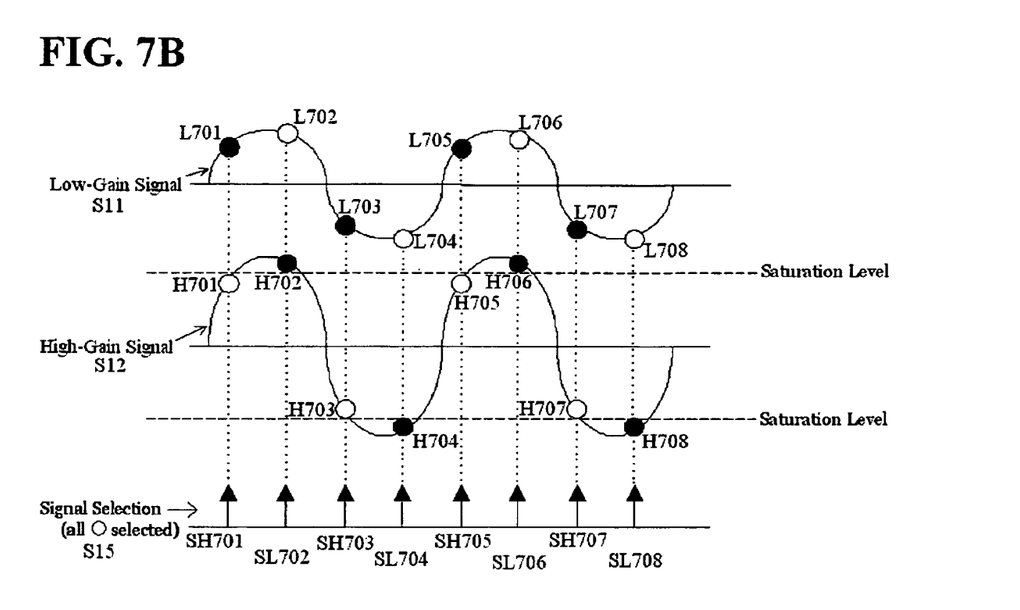
FIG. 7B illustrates exemplary aspects of operations performed by an underwater sounding apparatus according to the operations illustrated in the flow diagram of FIG. 7A.

FIG. 7B illustrates exemplary aspects of operations performed by an underwater sounding apparatus 40B according to the operations illustrated in the flow diagram of FIG. 7A. FIG. 7B illustrates exemplary aspects of operations for obtaining a composite signal S15.

In FIG. 7B, the low-gain digital signal S11 from A/D converter 417, the high-gain digital signal S12 from A/D converter 419, and the selection for composite signal S15 performed by selector 623 are shown. Gain compensation unit 629 inputs the high-gain digital signal S12 and compensates the gain of the output signal to match the gain of the low-gain digital signal S11.

When a data point of the high-gain digital signal S12 is lower than a saturation level, that data point is selected for composite signal S15. Hence, points H701, H703, H705, and H707 are selected from signal S12 for composite signal S15. When a data point of the high-gain digital signal S12 is equal to or above the saturation level, a corresponding data point from low-gain digital signal S11 is selected for composite signal S15. Hence, points L702, L704, L706, and L708 are selected from low-gain signal S11 for composite signal S15, because H702, H704, H706, and H708 from the high-gain signal S12 are above the saturation level.

The current application describes methods and apparatuses for processing underwater signals. The methods and apparatuses described in the current application provide a wide receiving dynamic range for underwater acoustic instruments. The methods and apparatuses described in the current application can be adapted to receive and process signals from one or more targets among targets of different strengths.

The methods and apparatuses of the present invention can receive and process simultaneous signals from a plurality of targets of different target strengths. The methods and apparatuses of the present invention obtain signals without saturation and with good S/N ratio, by changing amplifiers according to the target strength. Hence, methods and apparatuses of the present invention obtain good output signals even when signals of different target strengths are received in one transmission. Hence, while in the operation of the conventional technology the switching timing (a change at point X2 in FIG. 3B, for example) of amplifiers is set to match the characteristics of a TVG curve, in the present invention the switching timing (a change at point X2) of amplifiers varies automatically to match the input level of signals at the receiving amplifiers.

The methods and apparatuses of the present invention provide highly accurate results for measurement of underwater object properties such as fish length, quality of seabed, etc. The circuit diagrams implementing the methods and apparatuses in the current application are more efficient and easier to implement than conventional systems, because measurements of distance or time intervals are not needed to obtain non-saturated signals for acoustic signals reflected from underwater objects. The methods and apparatuses described in the current application process signals received from underwater objects and output signals without switching errors or discontinuous points.

Although the detailed embodiments described in the present application relate to processing of underwater signals, principles of the present invention may also be applied to other signals different from acoustic signals, originating in other media different from a water medium.

Although detailed embodiments and implementations of the present invention have been described above, it should be apparent that various modifications are possible without departing from the spirit and scope of the present invention.

We claim:

1. A method, said method comprising:
   receiving a first signal;
   obtaining a second signal and a third signal from said first signal, wherein a gain of said second signal is smaller than a gain of said third signal;
   detecting saturation in said third signal; and
   generating a composite signal from said second signal and said third signal, said step of generating a composite signal including
      selecting a part of said second signal for said composite signal, when said detecting step detects saturation in said third signal, and
      selecting a part of said third signal for said composite signal, when said detecting step does not detect saturation in said third signal,
   wherein sampling is performed for said second and third signals, and
   when a data point of said third signal is lower than a saturation level, said data point is selected for said composite signal, and
   when a data point of said third signal is equal to or higher than said saturation level, a corresponding data point from said second signal is selected for said composite signal.

2. The method as recited in claim 1, wherein said obtaining step includes:
   performing a low gain amplification of said first signal to obtain said second signal, and
   performing a high gain amplification of said first signal to obtain said third signal.

3. The method as recited in claim 1, further comprising:
   performing a gain compensation for at least one of said part of said second signal and said part of said third signal in said composite signal, to obtain a gain compensated signal.

4. The method as recited in claim 3, further comprising:
   performing a bandpass filtering of said composite signal, before said step of performing a gain compensation.

5. The method as recited in claim 3, further comprising:
   performing time variable gain control for said gain compensated signal.

6. The method as recited in claim 1, wherein said first signal is an acoustic signal received or reflected from an underwater object.

7. The method as recited in claim 1, wherein said obtaining step includes:
   performing a low gain amplification of said first signal to obtain a low gain amplified signal,
   performing an analog to digital conversion of said low gain amplified signal to obtain said second signal,
   performing a high gain amplification of said first signal to obtain a high gain amplified signal, and
   performing an analog to digital conversion of said high gain amplified signal to obtain said third signal.

8. A method, said method comprising:
   receiving a first signal;
   obtaining a second signal and a third signal from said first signal, wherein a gain of said second signal is smaller than a gain of said third signal; and
   generating a composite signal, said generating step including
      performing a gain compensation for said third signal, to obtain a gain compensated third signal,
      selecting apart of said second signal for said composite signal, when a saturation of said third signal is detected, and
      selecting a part of said gain compensated third signal for said composite signal, when no saturation is detected in said third signal,
   wherein sampling is performed for said second and third signals, and
   when a data point of said third signal is lower than a saturation level, said data point is selected for said composite signal, and
   when a data point of said third signal is equal to or higher than said saturation level, a corresponding data point from said second signal is selected for said composite signal.

9. The method as recited in claim 8, wherein said obtaining step includes:
   performing a low gain amplification of said first signal to obtain said second signal, and
   performing a high gain amplification of said first signal to obtain said third signal.

10. The method as recited in claim 8, further comprising:
    performing a bandpass filtering of said composite signal to obtain a bandpass filtered signal.

11. The method as recited in claim 10, further comprising:
    performing time variable gain control for said bandpass filtered signal.

12. The method as recited in claim 8, wherein said first signal is an acoustic signal received or reflected from an underwater object.

13. The method as recited in claim 8, wherein said obtaining step includes:
    performing a low gain amplification of said first signal to obtain a low gain amplified signal,
    performing an analog to digital conversion of said low gain amplified signal to obtain said second signal,
    performing a high gain amplification of said first signal to obtain a high gain amplified signal, and
    performing an analog to digital conversion of said high gain amplified signal to obtain said third signal.

14. An apparatus, said apparatus comprising:
    a signal input unit for providing a first signal;
    a signal processing unit for obtaining a second signal and a third signal from said first signal, wherein a gain of said second signal is smaller than a gain of said third signal; and a signal selection unit for generating a composite signal from said second signal and said third signal, said signal selection unit generating a composite signal by
detecting saturation in said third signal,
selecting a part of said second signal for said composite signal, when saturation is detected in said third signal, and
selecting a part of said third signal for said composite signal, when no saturation is detected in said third signal,
wherein
said signal processing unit performs sampling of said second and third signals, and
when a data point of said third signal is lower than a saturation level, said signal selection unit selects said data point for said composite signal, and
when a data point of said third signal is equal to or higher than said saturation level, said signal selection unit selects a corresponding data point from said second signal for said composite signal.

15. The apparatus according to claim 14, wherein said signal processing unit obtains said second signal and said third signal by
performing a low gain amplification of said first signal to obtain said second signal, and
performing a high gain amplification of said first signal to obtain said third signal.

16. The apparatus according to claim 14, further comprising:
a gain compensation unit for performing a gain compensation for at least one of said part of said second signal and said part of said third signal in said composite signal, to obtain a gain compensated signal.

17. The apparatus according to claim 16, further comprising:
a bandpass filtering unit for performing a bandpass filtering of said composite signal, before said gain compensation unit performs a gain compensation for at least one of said part of said second signal and said part of said third signal in said composite signal.

18. The apparatus according to claim 16, further comprising:
a time variable gain control unit for performing time variable gain control for said gain compensated signal.

19. The apparatus according to claim 14, wherein said first signal is an acoustic signal received or reflected from an underwater object.

20. The apparatus according to claim 14, wherein said signal processing unit obtains said second signal and said third signal by
performing a low gain amplification of said first signal to obtain a low gain amplified signal,
performing an analog to digital conversion of said low gain amplified signal to obtain said second signal,
performing a high gain amplification of said first signal to obtain a high gain amplified signal, and
performing an analog to digital conversion of said high gain amplified signal to obtain said third signal.

21. An apparatus said apparatus comprising:
a signal input unit for providing a first signal;
a signal processing unit for obtaining a second signal and a third signal from said first signal, wherein a gain of said second signal is smaller than a gain of said third signal; and
a signal selection unit for generating a composite signal, said signal selection unit generating a composite signal by
performing a gain compensation for said third signal, to obtain a gain compensated third signal,
selecting a part of said second signal for said composite signal, when a saturation of said third signal is detected, and
selecting a part of said gain compensated third signal for said composite signal, when no saturation is detected in said third signal,
wherein
said signal processing unit performs sampling of said second and third signals, and
when a data point of said third signal is lower than a saturation level, said signal selection unit selects said data point for said composite signal, and
when a data point of said third signal is equal to or higher than said saturation level, said signal selection unit selects a corresponding data point from said second signal for said composite signal.

22. The apparatus according to claim 21, wherein said signal processing unit obtains said second signal and said third signal by
performing a low gain amplification of said first signal to obtain said second signal, and
performing a high gain amplification of said first signal to obtain said third signal.

23. The apparatus according to claim 21, further comprising:
a bandpass filtering unit for performing a bandpass filtering of said composite signal to obtain a bandpass filtered signal.

24. The apparatus according to claim 23, further comprising:
a time variable gain control unit for performing time variable gain control for said bandpass filtered signal.

25. The apparatus according to claim 21, wherein said first signal is an acoustic signal received or reflected from an underwater object.

26. The apparatus according to claim 21, wherein said signal processing unit obtains said second signal and said third signal by
performing a low gain amplification of said first signal to obtain a low gain amplified signal,
performing an analog to digital conversion of said low gain amplified signal to obtain said second signal,
performing a high gain amplification of said first signal to obtain a high gain amplified signal, and
performing an analog to digital conversion of said high gain amplified signal to obtain said third signal.

* * * * *